United States Patent [19]

Perna et al.

[11] Patent Number: 4,994,673
[45] Date of Patent: Feb. 19, 1991

[54] RUGGEDIZED SCINTILLATION DETECTOR

[75] Inventors: Louis Perna, Elyria; Christopher W. Linden, North Ridgeville; Thomas C. Mincer, Maple Heights, all of Ohio

[73] Assignee: Solon Technologies, Inc., Solon, Ohio

[21] Appl. No.: 361,981

[22] Filed: Jun. 6, 1989

[51] Int. Cl.⁵ .............................................. G01V 5/04
[52] U.S. Cl. ............................. 250/483.1; 250/361 R
[58] Field of Search ......................... 250/483.1, 361 R

[56] References Cited

U.S. PATENT DOCUMENTS

| | | | |
|---|---|---|---|
| 2,853,621 | 9/1958 | Ruderman | 250/370.11 |
| 3,426,195 | 2/1969 | Menefee et al. | 250/485.1 |
| 4,004,151 | 1/1977 | Novak | 250/485.1 |
| 4,066,908 | 1/1978 | Farukhi et al. | 250/483.1 |
| 4,128,766 | 12/1978 | Stevens | 250/483.1 |
| 4,158,773 | 6/1979 | Novak | 250/361 R |
| 4,360,733 | 11/1982 | Novak et al. | 250/361 R |
| 4,383,175 | 5/1983 | Toepke | 250/368 |
| 4,647,781 | 3/1987 | Takagi et al. | 250/483.1 |
| 4,700,074 | 10/1987 | Bosnjakovic | 250/363 S |

*Primary Examiner*—Constantine Hannaher
*Assistant Examiner*—J. Eisenberg
*Attorney, Agent, or Firm*—Renner, Otto, Boisselle & Sklar

[57] ABSTRACT

A scintillation detector capable of withstanding high shock and/or high temperatures, comprises a scintillation crystal, a casing for the crystal, and a shock absorbing boot interposed between the crystal and the casing. The boot is characterized by a plurality of radially outwardly directed protrusions for engaging the casing. The protrusions define therebetween unfilled spaces to provide room into which the boot may expand at high temperatures. The protrusions may be longitudinally or radially extending ribs and the ribs may be generally rectangular or triangular in cross section. A reflector surrounds the crystal and preferably is in the form of a thin porous sheet of polytetrafluoroethylene (PTFE) wrapped tightly around the crystal. The boot preferably has a substantially continuous cylindrical interior surface for engaging the thin porous PTFE sheet to avoid high pressure concentrations.

21 Claims, 2 Drawing Sheets

RUGGEDIZED SCINTILLATION DETECTOR

The present invention relates generally to scintillation detectors and more particularly to a scintillation detector having a novel and improved boot and housing structure.

BACKGROUND OF THE INVENTION

Scintillation detectors are used in the oil industry for deep well logging. Typically, the detector is lowered into a bore hole in the earth for analysis of surrounding rock strata. The detectors are relatively small in diameter so that they may be accommodated in special logging equipment lowered into the bore hole. A common practice is to measure while drilling (MWD). For MWD applications the detector must be capable of withstanding high temperatures and also must have high shock resistance.

For many years there have been used well logging detectors which comprise relatively small diameter metal tubes or casings in which sodium iodide crystals (or other scintillation crystals of choice) are enclosed or encapsulated. The casing is closed at one end by a plug or cap and at the other end by an optical window which permits radiation induced scintillation light to pass out of the detector for measurement by a light sensing device such as a photomultiplier tube. Usually a hermetic seal is provided to prevent the crystal and other internal parts of the assembly from being damaged by exposure to the detector's environment. For example, sodium iodide crystals are highly hygroscopic and easily damaged if exposed to moisture.

The crystal in these prior art detectors has a diameter less than the internal diameter of the tube to provide an annular space which is filled with a highly reflective powder such as aluminum oxide powder. The reflective powder prevents the crystal from moving radially within the casing and further functions to reflect scintillation light back into the crystal for ultimate passage out of the crystal through the optical window. Usually an optical coupling is provided between the end of the crystal and the window and the crystal is biased by a spring or other resilient means towards the optical coupling at the window.

In U.S. Pat. No. 4,158,773 there is disclosed a scintillation detector wherein a silicone rubber sleeve is interposed between the crystal and the tubular casing for purposes of shock absorption. The sleeve has a multiplicity of closely arranged tapered protrusions radiating toward and engaging the crystal to cushion shocks. The radially inwardly directed protrusions define therebetween spaces which are filled with aluminum oxide powder. The silicone rubber composition of the sleeve may include aluminum oxide which enables the rubber sleeve to function as a light reflector. In an alternative embodiment the reflective powder is omitted and the cylindrical surface of the crystal is highly polished and surrounded by a thin cover layer or sheet of white paper or plastic, prefereably white Teflon (polytetrafluoroethylene). In turn, the thin cover layer is surrounded by the shock absorbing sleeve.

In U.S. Pat. NO. 4,383,175 there is disclosed another scintillation detector. In this detector a lubricating layer is interposed between the crystal and a surrounding layer of light-reflecting packing such as powdered aluminum oxide. The preferred lubricating layer is said to be a skived sheet of Teflon (polytetrafluoroethylene). This design is said to provide for reduction of friction between the crystal and the packed powder during temperature induced differential expansion of the crystal and casing.

SUMMARY OF THE INVENTION

The present invention provides an improved scintillation detector assembly. Principles of the herein described invention may be applied to provide a scintillation detector capable of withstanding high shock and/or high temperatures.

According to the invention, a scintillation detector comprises a scintillation crystal, a shock absorbing boot including resilient material circumscribing the crystal, and a housing having a casing wall circumscribing the boot, whereby the boot is interposed between the crystal and the casing wall. The boot is characterized by a plurality of radially outwardly directed protrusions for engaging the casing wall. The protrusions define therebetween spaces which preferably are unfilled with any liquid or solid material thereby to permit collapse of such spaces when the detector is subjected to high shock forces and further to provide room into which the boot may expand upon radial expansion of the crystal at high temperatures. The protrusions may be longitudinally or radially extending ribs and the ribs may be generally rectangular or triangular in cross section.

In a preferred embodiment of the invention a solid rather than granular/powder reflector is interposed between the crystal and boot. The reflector surrounds the cylindrical surface of the crystal and preferably is in the form of a thin porous sheet of polytetrafluoroethylene (PTFE) wrapped tightly around the crystal. The boot preferably has a substantially continuous cylindrical interior surface for engaging the thin porous PTFE sheet to avoid high pressure concentrations that might permanently damage the thin porous PTFE sheet and render it less effective as a reflector. A casing for the scintillation crystal includes at one end a radially inwardly protruding lip defining a window opening. An optical window is axially trapped between the lip and the crystal which preferably is resiliently biased against the lip by a spring and cushion pad assembly. The lip-window interface is hermetically sealed by a high temperature solder.

The invention comprises the foregoing and other features hereinafter fully described and particularly pointed out in the claims, the following description and the annexed drawings setting forth in detail certain illustrative embodiments of the inventions, these being indicative, however, of a few of the various ways in which the principles of the invention may be employed.

DETAILED DESCRIPTION

Figure 1:
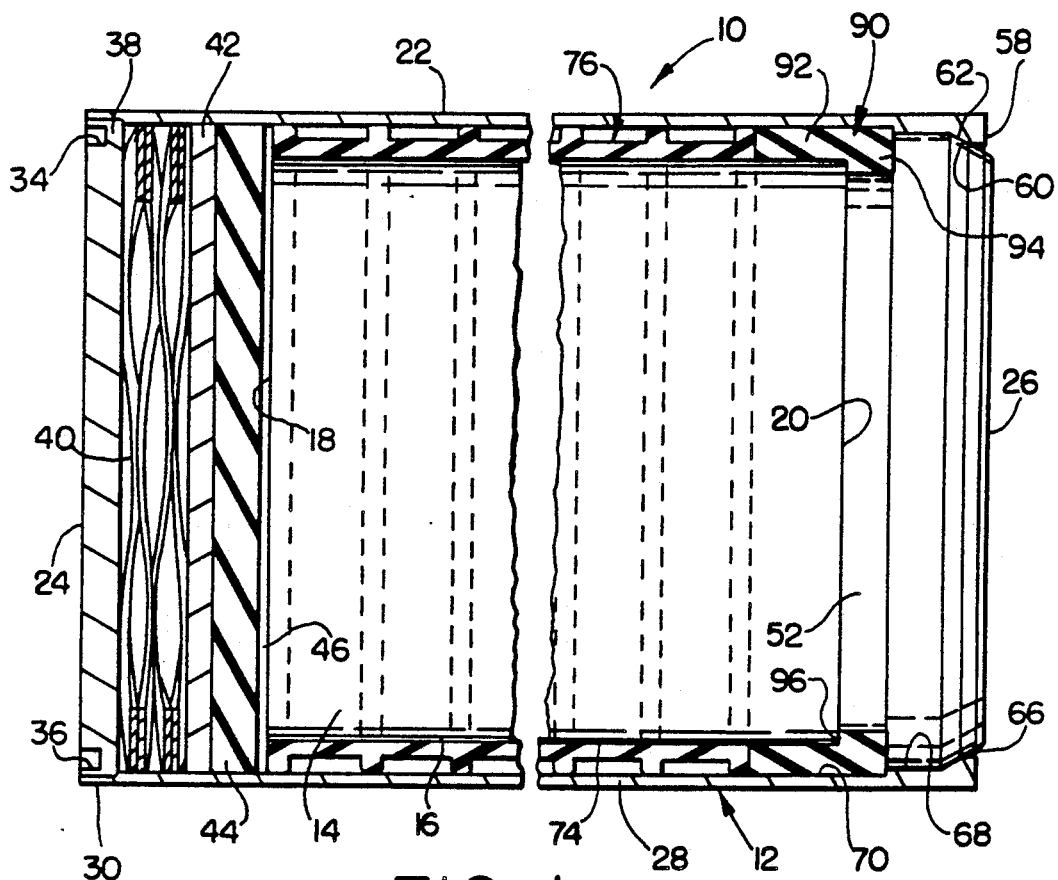
FIG. 1 is a fragmentary longitudinal sectional view of a scintillation detector according to the invention.

Referring now in detail to the drawings, FIG. 1 illustrates an exemplary and preferred scintillation detector 10 according to the present invention. The detector 10 comprises a housing 12 encapsulating a scintillation crystal 14. The crystal may be, for example, a thallium-activated sodium iodide crystal as in the illustrated embodiment. The crystal has a cylindrical surface 16 and flat end faces 18 and 20, the surface finish of which may be sanded, polished, ground, etc., to obtain a desired surface compensation.

The housing 10 includes a tubular metal casing 22 which preferably is cylindrical like the crystal as in the present case. The casing is closed at its rear end by a back cap 24 and at its front end by an optical window 26. The optical window should be made of a material transmissive to scintillation light given off by the scintillation crystal. In the illustrated embodiment the optical window is made of crown glass.

The casing 22 and back cap 24 preferably are made of stainless steel or aluminum, as is conventional. The back cap is joined to the rear end of the casing by a vacuum tight peripheral weld. As seen at the left in FIG. 1 the cylindrical wall 28 of the casing is interiorly recessed to form a welding flange 30 which defines a close fitting pocket for receipt of the back cap. The back cap has opening to its outer side an annular groove 34 spaced slightly inwardly from its circumferential edge to form a thin annular welding flange 36 and a reduced narrow thickness connecting web 38. Welding is effected at the outer ends of the juxtaposed then welding flanges 30 and 36, and the reduced thickness of the connecting web 38 further reduces welding heat conduction away from the welding flanges to permit formation of a desired weld.

The back cap 24 and crystal 14 have sandwiched therebetween, going from left to right in FIG. 1, a spring 40, backing plate 42, cushion pad 44 and end reflector 46. The spring 40, or other suitable resilient biasing means, functions to axially load the crystal and bias it towards the optical window 26, as is conventional. The spring preferably is a continuously wound wave spring of crest-to crest type. Other springs that may be used include wave springs of crest-to-valley type, coil springs, resilient pads, and the like.

The backing plate 42 functions to spread the spring force across the transverse area of the cushion pad 44 for substantially uniform application of pressure the the rear face 18 of the crystal. The spring pressure may be in the range of about 180 to 280 psi and more preferably is between 220 and 240 psi.

The cushion pad 44 is made of a resilient material and preferably a silicone rubber (elastomer) such as a Sylgard 186/184 blend elastomer to which a reflecting material such as aluminum oxide powder may be added. A preferred blend is, by weight, 10 parts Sylgard 186 base resin, 1 part Sylgard 186 curing agent, 1 part Sylgard 184 base resin and 1 part Sylgard 184 curing agent. The Sylgard resins are sold by Dow Corning Corporation of Midland, Mich. The thickness of the cushion pad may range from about 0.06 to 0.30 inch for most conventional size crystals ranging in diameter from about 0.25 to 3.0 inches and in length from about 0.5 inch to 15 inches. Preferably the cushion pad thickness is between about 0.15 and 0.20 inch and more preferably between about 0.18 and 0.19 inch.

The cushion pad 44 backs up the end reflector 46 which is formed by at least one and preferably two sheets of a white thin porous PTFE material. A preferred material is Tetratex porous unscintered PTFE film sold by Tetratec Corporation of Feasterville, PA. Being porous, air or gas can escape from between the reflector film and crystal face to avoid pockets of trapped air or gas. Such pockets of trapped air of gas could prevent the reflector from being urged by the cushion pad flat against the rear end face 18 of the crystal and thus have a negative impact on reflectability at the reflector-crystal interface. It also will be appreciated that the resilient pad will conform to the rear end face of the crystal should the rear end face not be perfectly flat. Preferably the reflector material is a 0.010 inch thick, 1.5 gm/cc film which is wrapped at least once around the crystal and possibly two or a few times to take up any looseness within the casing as may result from tolerance variations.

As above indicated the spring 40 resiliently urges the crystal 14 towards the optical window 26 to maintain an optical coupling via a layer 52 of suitable optical coupling material positioned between the front end face 20 of the crystal and the inner face of the optical window. In the illustrated embodiment the layer of optical coupling material is formed by a silicone rubber pad sandwiched between the crystal and the optical window. Preferably the interface pad 52 is preformed prior to assembly of the detector and is not bonded to the crystal and/or optical window such that the result is a contact only interface between the interface pad and the crystal and/or optical window. An exemplary material for the interface pad is the aforedescribed Sylgard 186/184 blend silicone elastomer which is transparent. The thickness of the interface pad may range from about 0.06 to 0.30 inch for most conventional size crystals ranging in diameter from about 0.25 to 3.0 inches and in length from about 0.5 inch it 15 inches. Preferably the thickness of the interface pad is between about 0.10 and 0.20 inch and more preferably between about 0.18 and 0.19.

As seen at the right in FIG. 1, the optical window 26 is retained in the casing 22 by an annular lip 58 at the fron end of the casing. The lip protrudes radially inwardly from the casing wall 28 and defines an opening having a diameter less than the diameter of the window. The lip has an axizlly inner beveled surface 60 and the optical window has a correspondingly beveled, axially outer, circumferential edge surface 62 which seats against the beveled surface 60. The mating beveled surfaces are hermetically sealed by a high temperature solder such as 95/5 or 95/10 lead/tin solder. The solder also aids in restraining the window against axial push-out, although its primary function is to effect a high temperature seal. As is apparent from the foregoing, the window is axially trapped between the lip and the crystal and is radially constrained by the casing wall. To permit wetting of the glass by the solder, the sealing edge surfaces of the window have applied thereto a metalized coating usch as platinum.

The beveled lip surface 60 may forwardly terminate at a relatively small diameter cylindrical surface 66 and rearwardly at a relatively larger diameter cylindrical surface 68. The cylindrical surface 68 preferably closely surrounds the axially inner portion of the optical window 26 and extends axially inwardly to a slightly larger diameter cylindrical surface 70 which extends axially to the welding flange 30 at the rear end of the casing 22. The axially inner face of the window preferably is aligned with the annular shoulder formed between the cylinrical surfaces 68 and 70.

Between the optical window 26 and the end reflector 46 the crystal 14 is surrounded by a layer 74 of reflecting material which in turn is surrounded by a shock absorbing boot 76. The layer 74 of reflecting material preferably is the above mentioned white thin porous PTFE material available from Tetratex Corporation of Feasterville, PA. As above noted air or gas that might otherwise be trapped between the reflector and the crystal can escape through the porous reflector media. The porous PTFE film is tightly wrapped around the crystal and generally is self adhering to the cylindrical surface of the crystal.

The shock absorbing boot 76 closely surrounds and preferably slightly grips the reflector layer 74 to aid in holding the PTFE reflector flim 74 tight against the crystal. As shown, the boot is cylindrical and is concentric with both the crystal 14 and casing 22. The boot is made of resilient material and preferably silicone rubber such as, for example, a Sylgard 186/184 blend elastomer or more preferably Sylgard 170 silicone elastomer, the latter being a fast setting silicone elastomer. Preferably the silicone elastomer does not include any fillers such as $Al_2O_3$ powder that may degrade performance.

Figure 2:
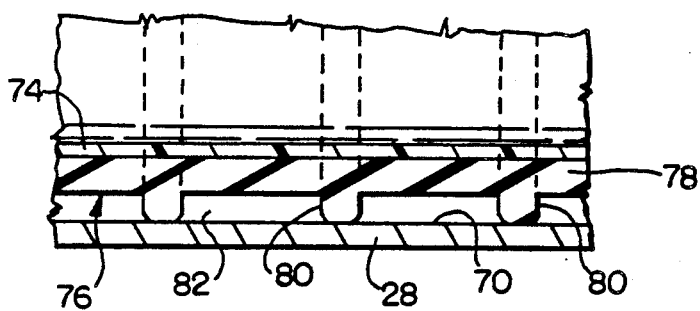
FIG. 2 is an enlarged portion of FIG. 1 showing a boot with circumferential ribs and surrounding parts of the detector.

With additional reference to FIG. 2, the boot 76 has a tubular wall 78 which has a cylindrical inner diameter surface which engages the PTFE reflector film 74 along substantially the entire length of the crystal. The boot also has a plurality of protrusions 80 which protrude radially outwardly from the tubular wall for engaging the interior surface 70 of the casing wall. The protrusions define therebetween spaces 82 which preferably are unfilled with any liquid or solid material thereby to permit collapse of such spaces when the detector is subjected to high shock forces and further to provide room into which the boot may expand upon radial expansion of the crystal at high temperatures.

In FIGS. 1 and 2, the protrustions 80 are in the form of circumferentially extending ribs. As best seen in FIG. 2 the annular ribs 80 are generally rectangular in cross section and project radially from the wall 78 a distance about equal the thickness of the wall. The radially outer surface of each rib may have rounded edges and the width of ribs may be substantially constant along its radial height.

For 0.25 to 3.0 inch diameter crystals, the radial length of the ribs may range from about 0.03 to 0.04 inch; the center-to-center axial spacing of the ribs may range from about 0.04 to 0.24 inch; and the axial width of the ribs may range from about 0.03 to 0.05 inch. By way of further exemplary and preferred dimensions, the radial thickness of the wall 78 may range from about 0.045 to 0.055 inch; and the overall radial thickness of the boot (wall and ribs) may range from about 0.07 to 0.1 inch and most preferably about 0.085 inch especially for a 1.5 inch diameter crystal.

Figure 3:
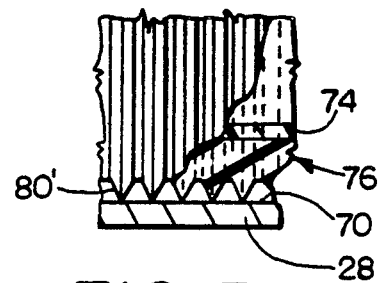
FIG. 3 is a view similar to FIG. 2 but showing an alternative form of circumferential rib.

As may be desired, the shape of the ribs 80 may be varied. In FIG. 3 an alternative form of annular rib 80' can be seen to be generally triangular in cross section with the vertex of the triangle contacting the interior surface 70 of the casing wall 28. The triangular shape is preferred when it is desired to locate the ribs at a center-to-center axial spacing less than about twice the axial thickness of the ribs, whereas the more rectangular shape is desirable at center-to-center axial spacings more than about twice the axial thickness of the ribs. In addition to varied cross sectional shapes for the ribs, the ribs may be arranged in varied patterns. Howeve, continuous ribs extending axially or circumferentially, or even helically, are preferred.

Figure 4:
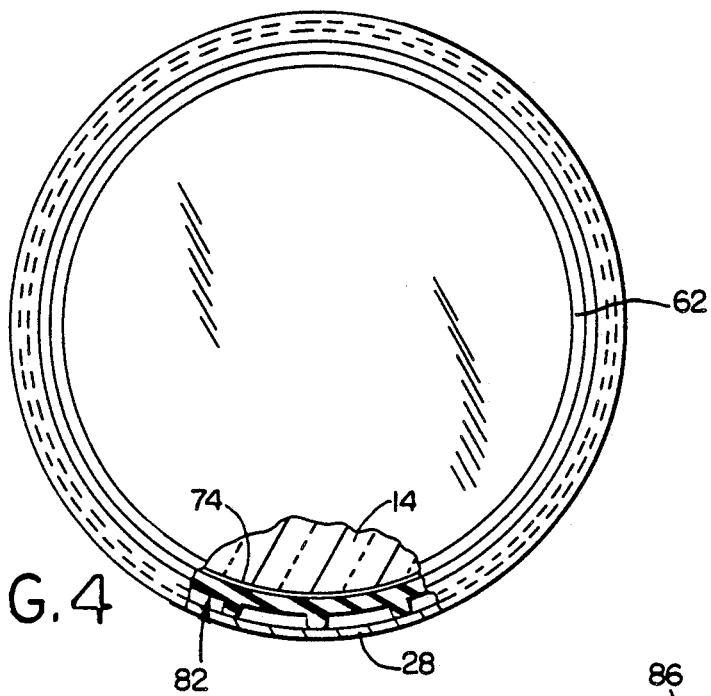
FIG. 4 is a radial sectional view of another embodiment of scintillation detector according to the invention.
Figure 6:
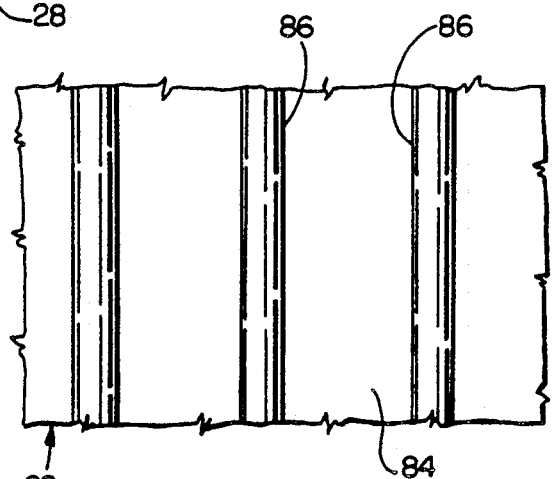
FIG. 6 is a sectional view taken along line 6—6 in FIG. 5.
Figure 5:
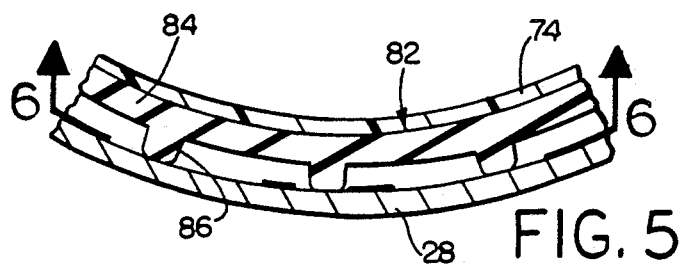
FIG. 5 is an enlarged portion of FIG. 4 showing a boot with axial ribs and surrounding parts of the detector of FIG. 4.

In FIGS. 4-6 another embodiment of the invention is illustrated. The FIGS. 4-6 embodiment is identical to the FIGS. 1 and 2 embodiment except for a different boot 82. The boot 84 has a tubular wall 84 from which axially or longitudinally extending ribs 86 protrude radially outwardly. The axially extending ribs 86 preferably extend the length of the boot.

Figure 7:
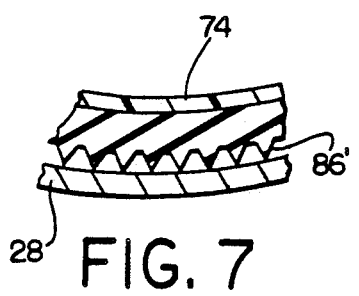
FIG. 7 is a view similar to FIG. 5 but showing an alternative form of axial rib.

Like in the FIGS. 1-3 embodiment, the ribs 86 may be generally rectangular in cross section as best seen in FIG. 5 or gnerally triangular in cross section as depicted by ribs 86' in FIG. 7. The spacing and dimensions of the ribs and boot wall may be generally as above described in connection with FIGS. 1-3, except that the thickness of and spacing between the ribs is measured circumferentially rather than axially. The closely circumferentially spaced, axially extending, tapered ribs of FIG. 7 are preferred.

Referring back to FIG. 1, the detector can be seen to include an additional component not yet described, i.e., locating ring 90. The locating ring functions to hold and center the circular interface pad 52 during assembly of the detector in the below described manner. The locating ring also forms a continuation of the boot and functions as a reflector surrounding the optical interface pad. As shown the locating ring extends from the front end of the boot to the optical window 26. The locating ring has an axially inner end portion 92 surrounding the crystal and an axially outer end portion 94 surrounding the interface pad. At the intersection of the interior surfaces of the axially inner and outer portions there is a shoulder 96 which functions to locate the locating ring on the crystal during assembly. The locating ring is made of resilient material and preferably a silicone rubber such as Sylgard 184 silicone elastomer to which about 2 parts by weight of $Al_2O_3$ powder is added.

The detector may be assembled by wrapping the crystal 14 with the thin reflector material 74 and then inserting the wrapped crystal into the boot 76. The locating ring 90 and interface pad 52 also are assembled to the front end of the crystal with the locating ring serving to hold the interface pad in proper position at the front face of the crystal. As will be appreciated the locating ring may be used in conventional manner as an interface mold if it is desired to mold the interface against the front end face of the crystal.

The thusly assembled components may then be inserted into the casing 22 through the open rear end thereof, the front end of the casing having previously been closed by the optical window 26 having been soldered in position against the lip 58 at the front end of the casing. Then, the end reflector 46, cushion pad 44, backing plate 42 and spring 40 may be assembled in the rear end of the casing after which the back cap 24 is urged under force to position, as by placing the detector in a clamping fixture. The back cap may then be welded to the casing to complete the assembly. The assembly process may take place in a nitrogen atmosphere or other controlled environment (such as a dry box) as may be needed to protect the crystals which may be highly hygroscopic.

From the foregoing it will be appreciated that the invention provides a detector capable of withstanding high temperatures and high shock loads. For example, a detector as shown and described may withstand temperatures as high as 160° and even 200° C. or higher and shock loads in excess of 400 g's and as high as 600 g's and even 1000 g's or higher. The novel construction of the detector also lends itself to economical and easy manufacture of scintillation detectors for industrial applications as well as deep well logging applications.

Although the invention has been shown and described with respect to preferred embodiments, it is obvious that equivalent alterations and modifications will occur to others in the art upon the reading and understanding of this specification. The present invention includes all such equivalent alterations and modifications, and is limited only by the scope of the following claims.

What is claimed is:

1. A scintillation detector comprising a scintillation crystal, a shock-absorbing boot comprising resilient material circumscribing said crystal, and a housing having a casing wall circumscribing said boot, whereby said boot is interposed between said crystal and said housing, and said boot having a tubular wall and a plurality of outwardly directed protrusions for engaging said casing wall.

2. A scintillation detector as set forth in claim 1, comprising a reflector interposed between said crystal and said boot, said reflector substantially surrounding said crystal.

3. A scintillation detector as set forth in claim 2, wherein said reflector includes a thin porous polytetrafluoroethylene film.

4. A scintillation detector as set forth in claim 3, wherein said crystal, said tubular wall and said casing wall are each cylindrical and concentric.

5. A scintillation detector as set forth in claim 3, wherein said boot has a smooth interior surface engaging said reflector.

6. A scintillation detector as set forth in claim 1, wherein said resilient material is a silicone elastomer.

7. A scintillation detector as set forth in claim 1, wherein said protrusions include elongated ribs.

8. A scintillation detector as set forth in claim 7, wherein said ribs are generally rectangular in cross section.

9. A scintillation detector as set forth in claim 7, wherein said ribs are triangular in cross section.

10. A scintillation detector as set forth in claim 9, wherein said ribs are transversely spaced apart a distance less than their transverse width.

11. A scintillation detector as set forth in claim 10, wherein said ribs extend axially.

12. A scintillation detector as set forth in claim 7, wherein said ribs are transversely spaced apart a distance greater than their transverse width.

13. A scintillation detector as set forth in claim 1, wherein said protrusions include axially extending ribs.

14. A scintillation detector as set forth in claim 1, wherein said protrusions include circumferentially extending ribs.

15. A scintillation detector comprising a scintillation crystal, a tubular casing for said scintillation crystal, end wall means closing a rear end of said casing, an optical window closing a front of said casing, a resilient shock-absorbing boot surrounding said crystal within said casing, said boot having a tubular wall and a plurality of protrusions projecting radially outwardly from said wall for engaging said casing, and a thin solid reflector interposed between said crystal and said boot, said boot having a smooth interior surface for engaging said thin solid reflector to avoid high pressure concentrations in said thin solid reflector.

16. A scintillation detector as set forth in claim 15, comprising a resilient optical coupling between said window and crystal, and means between said end wall means and crystal for resiliently urging said crystal towards said window.

17. a scintillation detector as set forth in claim 16, wherein said means for resiliently urging includes a spring, and an elastomeric pad is located between said spring and crystal.

18. A scintillation detector as set forth in claim 17, wherein said optical coupling is a pad of elastomeric material molded prior to assembly with respect to said crystal and window, and comprising locating means for holding said pad in position with respect to said crystal.

19. A scintillation detector as set forth in claim 18, wherein said casing includes a radially inwardly protruding lip defining an opening at the front end of said casing, said window is axially trapped between said lip and said crystal, and said window and lip have therebetween a high temperature solder interface.

20. A scintillation detector as set forth in claim 15, wherein said crystal is hermetically sealed within said casing.

21. A scintillation detector as set forth in claim 15, wherein said thin solid reflector is a thin porous polytetrafluoroethylene film.

* * * * *